US007043501B2

(12) United States Patent  
Schiller

(10) Patent No.: US 7,043,501 B2  
(45) Date of Patent: May 9, 2006

(54) METHOD FOR ANALYZING DEMOGRAPHIC DATA

(76) Inventor: Andrew Schiller, 39 Wildrose Ave., Worcester, MA (US) 01602

( * ) Notice: Subject to any disclaimer, the term of this patent is extended or adjusted under 35 U.S.C. 154(b) by 472 days.

(21) Appl. No.: 10/329,179

(22) Filed: Dec. 23, 2002

(65) Prior Publication Data

US 2003/0140040 A1    Jul. 24, 2003

Related U.S. Application Data

(60) Provisional application No. 60/342,285, filed on Dec. 21, 2001.

(51) Int. Cl.
*G06F 17/30* (2006.01)

(52) U.S. Cl. .................................. 707/104.1; 707/102

(58) Field of Classification Search ................... 707/3, 707/4, 5, 10, 101, 102, 104.1; 434/178; 435/7.21; 701/209; 705/1, 2, 3, 37, 52; 713/200
See application file for complete search history.

(56) References Cited

U.S. PATENT DOCUMENTS

2002/0035535 A1\* 3/2002 Brock ......................... 705/37

\* cited by examiner

*Primary Examiner*—Apu M. Mofiz
(74) *Attorney, Agent, or Firm*—Glenn C. Brown

(57) ABSTRACT

A computer implemented method of generating an ordered list of geographical locations having similarities in preselected categories relative to a first geographical location.

6 Claims, 29 Drawing Sheets

Figure 1:

Search around this new location:

WHERE AM I?
1. Specify what you want
2. Select a search area
3. Get your results

Step 1 – Enter a city and state OR enter a zip code:

CITY [Boston]
STATE [Massachusetts ▼]
ZIP [ ]

Next, the user specifies the area to search for locations that best match the location the user likes.

Step 2 – Enter a search radius: [5 miles ▼]

Optional – Enter a street address:
STREET [ ]

[SUBMIT]

Fig. 2

Find me a neighborhood like the one located here:

WHERE AM I?
1. Specify what you want
2. Select a search area
3. Get your results

Step 1 - Enter the street address

Next, the user specifies the location he likes by typing in any address in that location.

```
39 Wildrose Avenue
```

**\* Don't know the street address?**
Enter a zip code OR a state and city. Hit
CONTINUE to get a map so you can click on
the neighborhood you want.

CITY: Worcester
STATE: Massachusetts
ZIP:

Step 2 - Enter a city and state OR enter a zip code:

[CONTINUE]

© Copyright 2001 Location Inc Group

Fig. 3

▲ Crime

Neighborhood Look and Feel

▼ The Buildings

- Age
  - ☑ Consider all
  - ☐ Newer homes
  - ☐ Established but not old
  - ☐ Well established, older homes
  - ☐ Historic

- Size
  - ☑ Consider all
  - ☐ Large homes/apartments
  - ☐ Medium-sized homes/apartments
  - ☐ Small homes/apartments

- Type
  - ☑ Consider all
  - ☐ Single-family detached homes
  - ☐ Rowhouses and attached homes
  - ☐ Small apartment buildings
  - ☐ Complexes or high rise apartments —Consider all—

Fig. 9

- Ownership            ☐ Mobile homes

▶ The Setting         —Consider all—

- Densely urban to remote    ☑ Consider all
                             ☐ Densely urban
                             ☐ Urban
                             ☐ Suburban
                             ☐ Rural
                             ☐ Remote

- Land and Water      ☑ Consider all
                      ☐ Coastal
                      ☐ Farms ▶ Special Character   ☑ Consider all
                      ☐ Nautical
                      ☐ Walkable
                      ☐ Quiet

Fig. 10

The Neighbors

▲ Age and Lifestyle
- ☐ Artsy/funky
- ☐ Urban sophisticates
- ☑ Consider all
- ☐ Mixed ages
- ☐ Families with children
- ☐ Seniors
- ☐ College students
- ☐ Young singles - upwardly mobile ▲ Educated
[—Consider all— ▼]

▲ Income
- ☑ Consider all
- ☐ Wealthy
- ☐ Upper middle income
- ☐ Middle income
- ☐ Lower middle income
- ☐ Low income ▲ Occupations
- ☑ Consider all
- ☐ Executive, managerial & professional
- ☐ Sales & Service workers

Fig. 11

▶ Ethnicity/ancestry

- ☐ Clerical, assistants & technical support
- ☐ Manufacturing & Laborers
- ☐ Farmers, foresters, or fishers
- ☐ Government employees

- ☑ Consider all
- ☐ Hispanic (all Hispanics)
  - ☐ Puerto Rican
  - ☐ Mexican
- ☐ Black
- ☐ White (non-Hispanic)
- ☐ East Asian
- ☐ Asian Indian
- ☐ Arabian
- ☐ Irish ancestry
- ☐ Italian ancestry ▶ Language

- ☑ Consider all
- ☐ English speaking
- ☐ Spanish speaking
- ☐ Italian speaking
- ☐ French speaking

Fig. 12

☐ Portuguese speaking
☐ Russian speaking

SUBMIT

* Note: Best results are often achieved by choosing only one or a few key words. As you add more key words each one becomes less important in calculating your best matching neighborhoods.

© Copyright 2001 Location Inc Group

Fig. 13

Neighborhood Look and Feel

▶ The Buildings

- Age
  - ☐ Consider all
  - ☐ Newer homes
  - ☐ Established but not old
  - ☐ Well established, older homes
  - ☑ Historic

*In this illustration, the user simply wants to find a location with historic, large homes. He or she selects those two key words.*

- Size
  - ☐ Consider all
  - ☑ Large homes/apartments
  - ☐ Medium-sized homes/apartments
  - ☐ Small homes/apartments

- Type
  - ☑ Consider all
  - ☐ Single-family detached homes
  - ☐ Rowhouses and attached homes
  - ☐ Small apartment buildings
  - ☐ Complexes or high rise apartments
  - ☐ Mobile homes

- Ownership
  - —Consider all—

Fig. 14

Summary of Search Results

WHERE AM I?
1. Specify what you want
2. Select a search area
3. Get your results

YOUR SEARCH CRITERIA

Find me a neighborhood like this: Historic homes, Large dwellings [CHANGE]

Search here: within 5 miles of Newport, RI [CHANGE]

MATCHING NEIGHBORHOODS

Viewing results: 1 - 5

[UPDATE MAP]  [NEXT >]

In our current example, the user has chosen historic homes, and large homes. The user then chose to search within 5 miles of Newport, RI. Matches were calculated as describe in the preceding slide, and the two top matching locations to the selected set of key words are shown here. As can be seen, the best matching location is an 82% match to the selected key words.

| LOCATION (click on neighborhood for information) | RANKING | MATCH LEVEL | AVAILABLE HOUSES | AVAILABLE APARTMENTS |
|---|---|---|---|---|
| Newport RI neighborhood #9 | 1 | 82% | 2 | 2 |
| Middletown RI neighborhood #3 | 2 | 78% | 2 | 2 |

Fig. 17

Here we see that this location in Newport, RI was an 83% match to the key word "historic homes," and an 82% match to the key word "large dwellings." This means that this location has a greater proportion of homes characterized as historic than does 83% of the census tracts in America, and this location has a greater proportion of large homes than does 82% of the census tracts in America.

In the left-hand column are listed in descending order the actual percentages of buildings in each class, while the matches are based on the percentages of census tracts in America that have fewer percentages of the types of buildings the user wishes to have in a location. Thus, the left hand column shows the user what to expect in the location (Newport, RI neighborhood#9), and the match level shows how this census tract falls relative to other census tracts in America in regards to the characteristics chosen by the user (historic homes and large homes).

Neighborhood comparison table

| Newport, RI neighborhood # 9 | The key words you selected: |
|---|---|
| Neighborhood Look & Feel | |
| The Buildings | |
| • Age | |
| Mostly Established but not old, Some Well established older homes, Some Historic homes, Some Newer Homes | Historic homes |
| • Size | |
| Mostly Medium-sized dwellings, Some Small dwellings, Some Large dwellings | Large dwellings |

Fig. 18

Add or subtract words to modify this neighborhood:

The key words that describe your starting neighborhood are checked below. Add or subtract words to modify this neighborhood to suit you.

Then hit submit to find your best matches. [SUBMIT]

For a description of any key word, point your mouse at the word.

WHERE AM I?
① Specify what you want
② Select a search area
③ Get your results > The user is then presented with a scrollable page and asked to add or subtract words to modify the location as they wish. The next series of pages show how this location – 39 Wildrose Avenue, Worcester, Massachusetts, is described, and all the things the user could chose to modify it.

▲ Neighborhood Cost

[ High cost relative to nation ▼ ]

▲ Schools

[ 3 ▼ ]
(10 is highest school quality)

▲ Crime

[ 4 ▼ ]
(10 is lowest crime)

Fig. 21

Neighborhood Look and Feel

▶ The Buildings

- Age
  - ☐ Consider all
  - ☑ Newer homes
  - ☑ Established but not old
  - ☑ Well established, older homes (mostly)
  - ☑ Historic

- Size
  - ☐ Consider all
  - ☑ Large homes/apartments
  - ☑ Medium-sized homes/apartments (mostly)
  - ☑ Small homes/apartments

- Type
  - ☐ Consider all
  - ☐ Single-family detached homes
  - ☐ Rowhouses and attached homes
  - ☐ Small apartment buildings
  - ☑ Complexes or high rise apartments (mostly)
  - ☐ Mobile homes

Fig. 22

- Ownership  [Owners]

▶ The Setting

- Densely urban to remote
  - ☐ Consider all
  - ☐ Densely urban
  - ☐ Urban
  - ☑ Suburban (mostly)
  - ☐ Rural
  - ☐ Remote

- Land and Water
  - ☑ Consider all
  - ☐ Coastal
  - ☐ Farms

▶ Special Character
  - ☐ Consider all
  - ☐ Nautical
  - ☑ Walkable
  - ☑ Quiet
  - ☑ Artsy/funky
  - ☑ Urban sophisticates

Fig. 23

The Neighbors

▶ Age and Lifestyle
- ☐ Consider all
- ☑ Mixed ages (mostly)
- ☑ Families with children
- ☑ Seniors
- ☑ College students
- ☑ Young singles – upwardly mobile ▶ Educated

[ 9 ▸ ]
(10 is most educated)

▶ Income
- ☐ Consider all
- ☐ Wealthy
- ☑ Upper middle income (mostly)
- ☐ Middle income
- ☐ Lower middle income
- ☐ Low income ▶ Occupations
- ☐ Consider all
- ☑ Executive, managerial & professional (mostly)
- ☑ Sales & Service workers
- ☑ Clerical, assistants & technical

Fig. 24

Ethnicity/ancestry
- ☑ Manufacturing & Laborers
- ☐ Farmers, foresters, or fishers
- ☑ Government employees

- ☐ Consider all
- ☐ Hispanic (all Hispanics)
  - ☐ Puerto Rican
  - ☐ Mexican
- ☑ Black
- ☑ White (non-Hispanic) (mostly)
- ☐ East Asian
- ☑ Asian Indian
- ☐ Arabian
- ☑ Irish ancestry
- ☑ Italian ancestry

Language
- ☐ Consider all
- ☑ English speaking (mostly)
- ☐ Spanish speaking
- ☐ Italian speaking
- ☐ French speaking
- ☐ Portuguese speaking
- ☐ Russian speaking

Fig. 25

NEIGHBORHOODSCOUT™
the most powerful way to find your best place to live anywhere in America.

| MATCH a neighborhood I like | MODIFY an existing neighborhood to suit me | about Location Inc | frequently asked questions | BUILD my own ideal neighborhood | TELL ME all about a specific neighborhood | contact us | home |

Search results are delivered. Here the user sees that she wanted a location like 39 Wildrose Avenue in Worcester, yet modified to have top-quality public schools and a low crime rate. And, that the area to search for matches is within 15 miles of Worcester.

Summary of Search Results you want
search area
your results

YOUR SEARCH CRITERIA

Find me a neighborhood like this: 39 Wildrose Avenue Worcester, MA MODIFIED: Public Schools 10, Crime rate 10  [CHANGE]

Search here: within 15 miles of Worcester, MA  [CHANGE]

Fig. 28

Here the results are presented with match levels. One can see that the 2nd best match in the search area is the original, unmodified neighborhood itself. The best match is a location in Holden, MA.

The unique calculation used to match modified locations is shown in the next slide

YOUR SEARCH CRITERIA

Find me a neighborhood like this: 39 Wildrose Avenue Worcester, MA MODIFIED: Public Schools 10, Crime rate 10  [CHANGE]

Search here: within 15 miles of Worcester, MA  [CHANGE]

BEST MATCHING NEIGHBORHOODS

Viewing results: 1 - 5

[< PREVIOUS]  [UPDATE MAP]  [NEXT >]

| LOCATION (click on neighborhood for information) | RANKING | MATCH LEVEL | AVAILABLE HOUSES | AVAILABLE APARTMENTS |
|---|---|---|---|---|
| Holden MA neighborhood #3 | 1 | 91% | 2 | 2 |
| Worcester MA neighborhood #8 | 2 | 90% | 2 | 2 |
| Shrewsbury MA neighborhood #4 | 3 | 90% | 2 | 2 |
| Ashland MA neighborhood #1 | 4 | 90% | 2 | 2 |
| Leicester MA neighborhood #1 | 5 | 89% | 2 | 2 |

Fig. 29

METHOD FOR ANALYZING DEMOGRAPHIC DATA

CROSS REFERENCE TO RELATED APPLICATION

This application is a continuation of U.S. provisional patent application No. 60/342,285, filed on Dec. 21, 2001. The priority of this prior application is expressly claimed and its disclosure is hereby incorporated by reference in its entirety.

BACKGROUND OF THE INVENTION

The present invention relates to a system for analyzing and comparing demographic and other data related to identifiable geographic areas to evaluate their similarity or dissimilarity. More specifically, this invention relates to a new system for calculating numeric values that are related to identifiable characteristics for a specific area of the country based on that area's demographic and other information and comparing it to a similarly generated numbers for another area of the country to determine the relative similarity or differences. A forty-page inventor's disclosure is attached which illustrates the present invention.

Currently, a broad range of data regarding the character of particular areas of the country is available for public access. The data however is in raw form. Data describing the demographics, crime rates, educational quality, housing characteristics, employment opportunities, climates and geographic data is all available for review. The difficulty is that none of the data is presented in a manner that facilitates accurate and easy comparison between selected geographic areas that can incorporate multiple characteristics regarding each area. Although many services attempt to provide comparison information, the accuracy provided by these systems is questionable. For example, if a person wished to find several cities that had similar characteristics and qualities to the town in which they currently lived, they would have to first find the city in which they are interested and subsequently search all of the data to find cities having similar data sets.

The other difficulty is that the data that is available is primarily numeric making searching difficult. Before a user could search the data to arrive at a useful result, the user would have to have a thorough understanding of the rating system used in the database.

SUMMARY OF THE INVENTION

In accordance with the present invention a system is provided that automatically analyzes and compares the data available in the database to produce a result based on user selected input and desired characteristics. The present invention provides both for a system of analyzing the available data and a method of comparing the data to arrive at a listing of comparable geographic areas based on the users desired characteristics. The first aspect of the present invention is the utilization of known statistical and mathematical functions using Principal Components Analysis to produce factors followed by squared Euclidean distance calculated on these resulting factors. This mathematical function is applied to compare large amounts of demographic, crime, school and geographic data for identifiable locations all across America relative to each other. The result of this unique mathematical function provides a quantitative value for each pair of locations that are compared providing a matrix containing a quantitative measure of dissimilarity for each compared set of locations in America.

The method first compares the numbers related to the first chosen characteristic of each geographic area of interest, calculates their difference and squares it. The method then repeats this calculation on the second chosen characteristic and adds the result to the result of the first calculation. This process is repeated using each of the identifiable characteristics related to the given geographic areas. This aggregate number is then placed in a matrix in the location identified by the intersection of the row containing the first geographic area of interest and the column containing the second area of interest. The larger the accumulated value between any two intersecting rows and columns in this matrix, the more dissimilar those two locations are based on all of the factors used to describe the locations. Small numeric values between any two locations in the matrix means those locations are quite similar to each other based on all of the factors used to describe the locations. Thus, the present invention provides a system for the development of quantitative measures of similarity between all locations in America.

The second component of the present invention is the use of key word descriptors that provide a verbal expression describing features and characteristics of locations, where each key word is related to the quantitative values provided in an underlying data base that reflect local conditions in particular geographic areas. This component allows users of the application to select verbal, natural language descriptors in the form of these key words to easily relate to and identify characteristics that they find desirable about a geographic location and instruct the application of the present invention to find locations that most closely match the chosen characteristics. Using key words that correspond to identifiable quantitative values to describe locations creates an interface that allows the users never have to think in quantitative terms, while still requesting a list of locations that have the characteristics that they want. Once the user selects the key words that correspond to the characteristics that they find desirable, the application of the present invention converts the key words to quantitative values and performs an average absolute difference calculation to compute a value corresponding the selected set of keywords and the overall level of similarity between the key words a user chooses, and real locations that exist.

The final component of the application of the present invention is the ability of the user to choose a location they presently find desirable and view the set of key words that are associated with that location. The user can then modify the set of key words by select or unselect key words that describe the location adding and subtracting key words that they either like or dislike, resulting in a modified set of key words. This new set of key words can then be used as a new set of search criteria to find locations that best match these newly selected key words. This allows a user to find locations that are comparable to an existing location that they like, but with, for example, less crime, better schools, or less expensive housing. Again as stated above once the set of keywords is provided by the user, the application calculates the average absolute difference between all of the data base values using the value for the original location, in combination with the newly modified keywords selected by the user.

The present invention therefore as described above provides both for the underlying method of analysis of the demographical data, the various means of user interface provided in the application and the process whereby the application is used by a user to provide meaningful analysis of the demographic data.

DETAILED DESCRIPTION OF THE INVENTION

Referring now to the drawings, the invention will be described in greater detail.

The first distinctive component is the utilization of known statistical and mathematical functions (Principal Components Analysis followed by squared Euclidean distance calculated on the resulting factors) applied to large amounts of demographic, crime, school, and geographic data for locations all across America. The result of this unique combination is the creation of a matrix containing a quantitative measure of dissimilarity for all locations in America. The larger the value between any two intersecting rows and columns in this matrix, means those locations are more dissimilar based on all of the factors used to describe the locations. Small numeric values between any two locations in the matrix means those locations are quite similar to each other based on all of the factors used to describe the locations. Thus, this approach allows the development of quantitative measures of similarity between all locations in America.

The second distinctive component of this application is the use of key words that describe features and characteristics of locations, where each key word is linked to quantitative values in an underlying data base, values that reflect local conditions. This unique approach allows users of the application to select these easy to understand key words to choose what characteristics they wish to have in a location, and then ask the application to find locations that most closely match those chosen characteristics. Using key words that describe locations linked to quantitative values in a data base means users never have to think in quantitative terms, but can still request to find those locations that have characteristics they want.

The third distinctive component of this application is the use of an average absolute difference calculation to compute the match level between the key words a user chooses, and real locations that exist.

The fourth distinctive component of this application is the ability of the user to choose a location they like, and then select or unselect key words that describe the location, resulting in the modification of the location and, thus, a new set of search criteria to use to find locations that best match these criteria. This allows a user to find locations just like a location they like, but with, for example, less crime, better schools, or less expensive housing. To find best matching locations to these modified criteria, average absolute difference is calculated between all of the data base values for the original location, in combination with the new modifications selected by the user. Each of these four unique characteristics is further described below.

Referring to FIG. 1, the user first chooses a method to find the best location for him. In the illustrated case, the user has chosen to match an existing neighborhood that the user likes. Next, the user specifies the location he likes by typing in any address in that location as shown in FIG. 2. Next, the user specifies the area in which to search for locations that best match the location the user likes (FIG. 3).

The search the user requested above is done by searching a data base with the following structure:

TABLE 1

Example dissimilarity matrix.

| | Location 1 | Location 2 | Location 3 | Location 4 |
|---|---|---|---|---|
| Location 1 | 0 | 38 | 2 | 109 |
| Location 2 | | 0 | 11 | 6 |
| Location 3 | | | 0 | 1 |
| Location 4 | | | | 0 |

Figure 4:
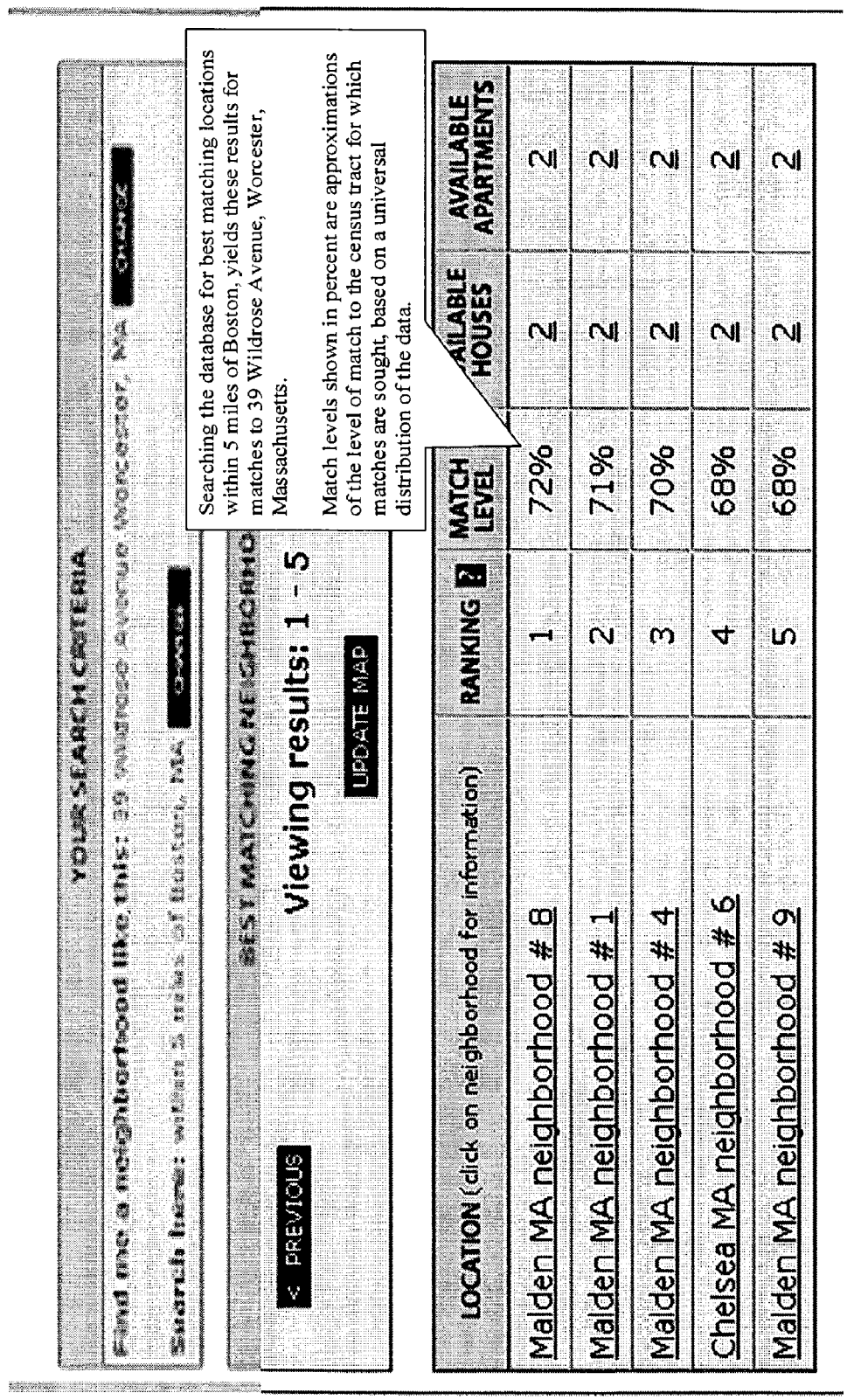

Values between any two intersecting rows and columns represent the dissimilarity between the two locations labeled on the axes. Larger numbers denote larger difference. Smaller numbers denote smaller difference. Zero denotes either identity (the intersecting row and column represent the same location) or that two different locations are identical. To conduct the search the user specified above, only those locations within five miles of downtown Boston would be included, and then those locations with the smallest numbers between them and the location for which the user chose to find a match would be shown to the user as the result of the user's search, and would be displayed to the user as shown in FIG. 4.

The dissimilarity values between locations, like in the example matrix shown in Table 1 are calculated as follows:

TABLE 1

Example dissimilarity matrix.

| | Location 1 | Location 2 | Location 3 | Location 4 |
|---|---|---|---|---|
| Location 1 | 0 | 38 | 2 | 109 |
| Location 2 | | 0 | 11 | 6 |
| Location 3 | | | 0 | 1 |
| Location 4 | | | | 0 |

Step 1. Data are collected for nearly 200 characteristics for each location (in this case, census tract) in America.

Step 2. a factor analysis using Principal components as the extraction method is performed on the data (formula shown in A). This rids the raw data of multicolinearity, and simultaneously serves to standardize all values.

A. The principal component factor analysis of the correlation matrix R is specified in terms of its eigenvalue-eigenvector pairs, $$\left(\frac{\Omega}{\lambda_1}, \frac{\Omega}{\lambda_1}\right), \left(\frac{\Omega}{\lambda_2}, \frac{\Omega}{\lambda_2}\right), \ldots, \left(\frac{\Omega}{\lambda_N}, \frac{\Omega}{\lambda_N}\right),$$

where $\frac{\Omega}{\lambda_1} \geq \frac{\Omega}{\lambda_2} \geq \ldots \geq \frac{\Omega}{\lambda_\gamma}$.

And where m<p is the number of common factors, and p is the total number of original variables (in this case 26 sustainable development indicators).

The estimated specific variances are provided by the diagonal elements of the matrix.

R−L̃L̃′, such that $$\tilde{\psi} = \begin{bmatrix} \tilde{\psi}_1 & 0 & \cdots & 0 \\ 0 & \tilde{\psi}_2 & \cdots & 0 \\ \vdots & \vdots & \ddots & \vdots \\ 0 & 0 & \cdots & \tilde{\psi}_\gamma \end{bmatrix} \text{ with } \tilde{\psi}_i = R_{ii} - \sum_{j=1}^{m} \tilde{l}_{ij}^2$$

for ith variable, jth factor.

Communalities are estimated as $\tilde{h}_i^2 = \tilde{l}_{i1}^2 + \tilde{l}_{i2}^2 + \ldots + \tilde{l}_{im}^2$ Step 3. The number of factors extracted is set to capture 95% of the total variance contained in the original data.

Step 4. The extracted factors are saved in the data base, thus there are factor scores for each census tract for every factor.

Step 5. The saved factors scores for every census tract in America are input to the formula in B to calculate a dissimilarity matrix containing all census tracts.

This results in a "distance" matrix or dissimilarity matrix showing a mathematical calculation of the similarity or dissimilarity of every census tract in America, to every other census tract in America.

B. A dissimilarity matrix for the census tracts is calculated based on squared Euclidean distance across factor values for each of the census tracts in America, such that:

$$d_{ij} = \sum_k (x_{ik} - x_{jk})^2$$

where d=distance, and $x_{ik}$=value of factor k for census tract i.

What is unique here is the application of first the factor analysis, and then the squared Euclidean distance measure to resultant factors that are composed of geographic, school, crime, and demographic data describing locations in America, such that a true measure of similarity between all included locations is derived. That this is applied to geographic location to find similarity is unique, it should not be limited to the notion of census tracts only. The result of this unique combination of statistics and mathematics to this type of data is a way for people to specify a location they like, and then instantly search the database to find best matching locations in any part of the country in which the user has an interest. It is this combination of known elements that is the first unique element in this product.

Searching the database for best matching locations within 5 miles of Boston, yields these results shown in FIG. 4 for matches to 39 Wildrose Avenue, Worcester, Mass. Match levels shown in percentages are approximations of the level of match to the census tract for which matches are sought, based on a universal distribution of the data.

Figure 5:
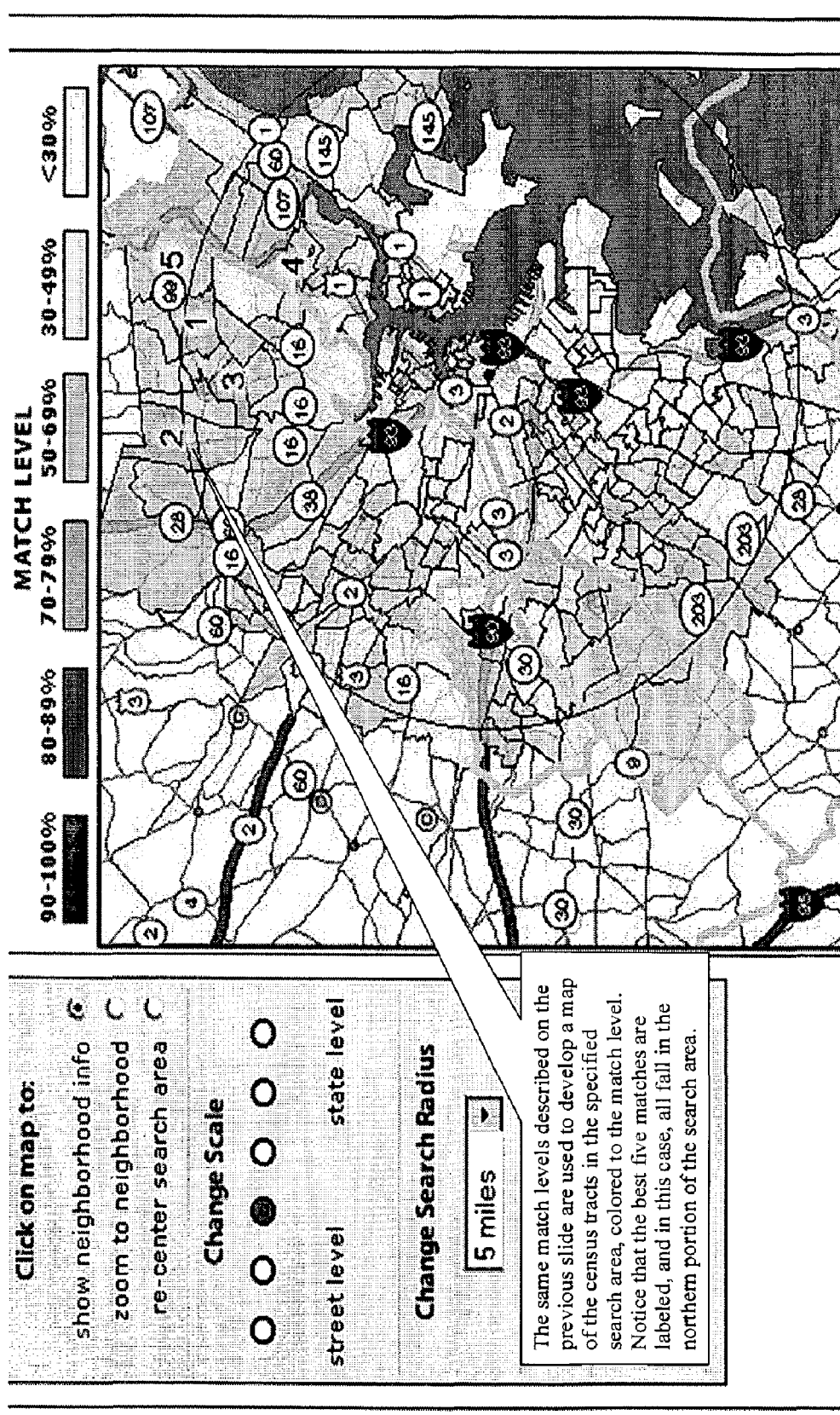
Figure 6:
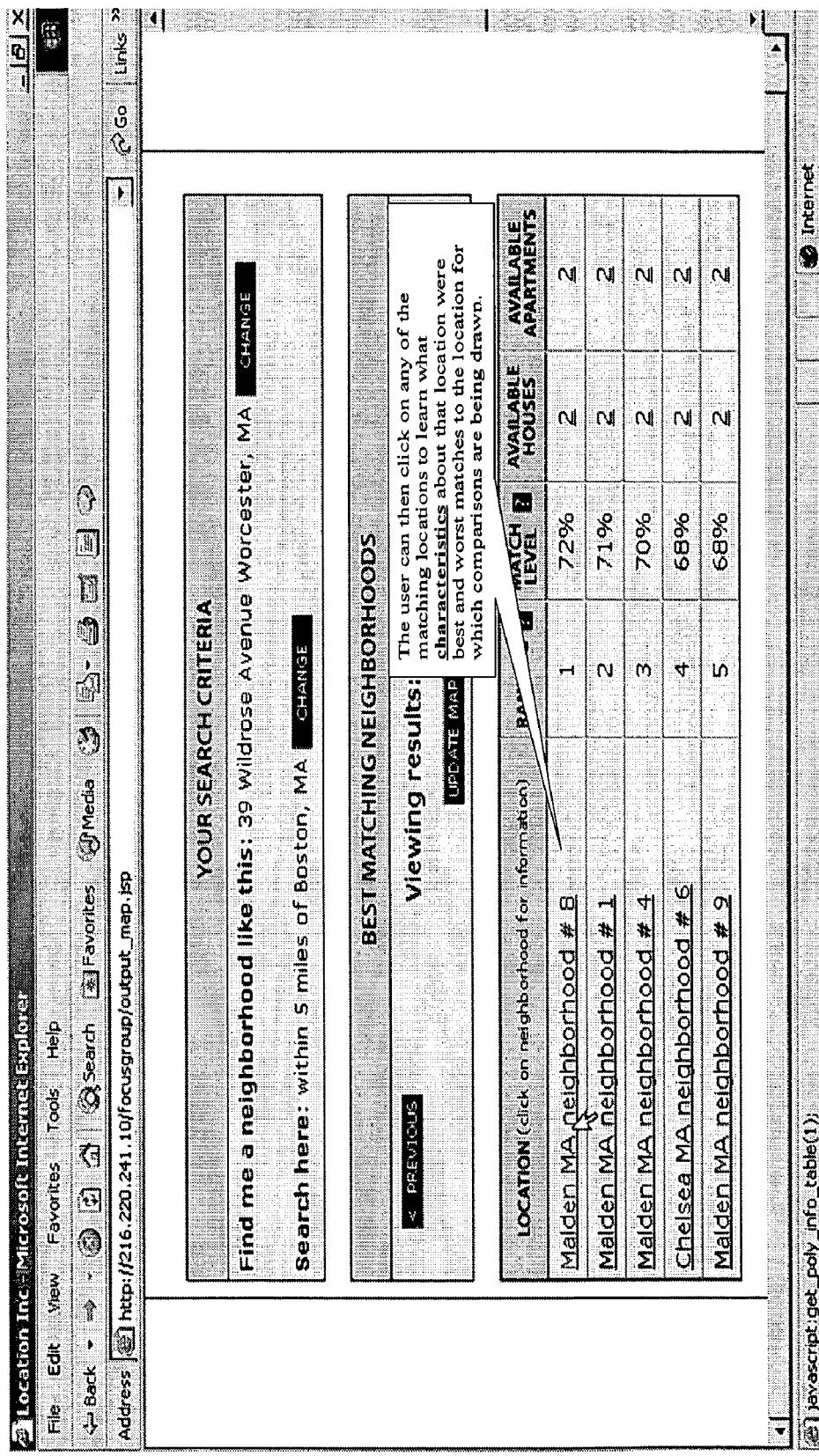

Referring to FIG. 5, in another aspect of the invention the same match levels described FIG. 4 are used to develop a map of the census tracts in the specified search area, colored to the match level. Notice that the best five matches are labeled, and in this case, all fall in the northern portion of the search area. Referring to FIG. 6, the user can then click on any of the matching locations to learn what characteristics about each location are the best and worst matches to the location for which comparison are being drawn. For example, Table 2 below compares categorized characteristics (e.g., cost of housing or school quality) of the selected census tract to categorized characteristics of the census tract for which matches were requested. This allows the user to see at a glance what the characteristics are of the matching census tract, and also to learn which characteristics are the best and worst matches between the two census tracts. Here we see that cost is quite similar (90% match), but that public school quality and crime rate are quite dissimilar (60% match for each).

TABLE 2

Neighborhood comparison table

| Malden, MA neighborhood #8 | Worcester, MA neighborhood #8 |
|---|---|
| Neighborhood Cost 90% | |
| High Cost | High Cost |
| Relative to the Nation | Relative to the Nation |
| Medium Cost | Low Cost |
| Relative to MA | Relative to MA |
| Public Schools 60% | |
| School quality: 7 (10 is best) | School quality: 3 (10 is best) |
| Crime Rate 60% | |
| Crime rate: 8 (10 is least crime) | Crime rate: 4 (10 is least crime) |

Table 3 below, which can be selected by the user, is a continuation of the breakdown of the categories of characteristics, and how well they match the census tract for which matches were sought. These calculations for matches by category are based on the average absolute difference between rank percent values for all characteristics in each category. This calculation is explained on the next slide.

TABLE 3

Neighborhood Look & Feel
The Buildings

| Age 72% | |
|---|---|
| Mostly established, but not old. Some well established older homes. Some historic homes. Some newer homes | Mostly well established older homes. Some established, but not old. Some historic homes. Some newer homes. |
| Size 6% | |
| Mostly small dwellings. Some medium-sized dwellings. Some large dwellings | Mostly medium-sized dwellings. Some small dwellings. Some large dwellings. |
| Type 81% | |
| Mostly small apartment buildings. Some complexes/high rise apartments. Some rowhouses & attached homes. Some single-family homes. | Mostly complexes/high rise apartments. Some small apartment buildings. Some single-family homes. Some rowhouses & attached homes. |
| Ownership 46% | |
| Mostly renters | Mixed owners & renters |

Overall matches for one census tract to the other are calculated as set forth previously. However, matches for different categories of characteristics within the census tracts—to show the user what elements of the census tracts are the best and worst matches to the census tract the user wishes to match—such as age or type of homes—are based on the average absolute difference between rank percent values for each characteristic in any category. This approach and calculation are outlined below.

Step 1. Rank percent scores are calculated for each characteristic, as shown in C, and saved in the data base.

For ranking, ties are assigned the highest value, and the first rank is assigned a value of 0. This serves to curve the values for each characteristic, such that the rank percent values show the percentage of census tracts in America that are better matches to that specific characteristic than the current census tract (e.g., a rank percent score of 10.5 means that 10.5 percent of the census tracts in America had higher scores for that characteristic than the current census tract).

C. Rank percent=(k/N)* 100

Where k is assigned rank from 1 . . . N, and N is the total number of cases (census tracts).

Step 2. The average absolute difference between any category of characteristics (e.g., types of housing) for any two census tracts is calculated on demand, as shown in D. Only the characteristics within each category are included for this calculation (e.g., for types of housing this would be the average absolute difference in rank percent scores between two compared census tracts for these categories: detached single family homes, small apartment buildings, big apartment buildings, townhouses or other attached homes, and mobile homes). As the value inflates for this category, the match for housing type between the two census tracts is shown to be less good. Lastly, the results of the calculation in D are subtracted from 100, so a value of 10 becomes a 90% match. See the previous slide for an example.

$$\text{D.} \quad M_{CC}Z = MccZ = \sum_k \text{ABS}(x_{ik} - x_{jk})/n$$

where $M_{CC}Z$=match level for characteristic category Z, $X_{ik}$=value of rank percent score k for census tract 1, and n= the number of k characteristics in characteristic category Z.

Figure 7:
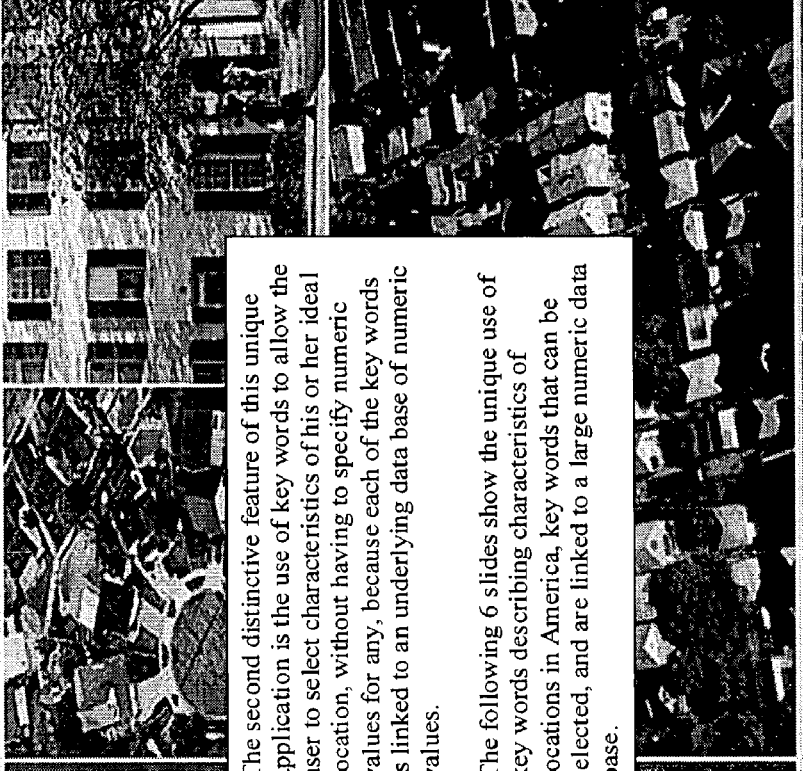
Figure 8:
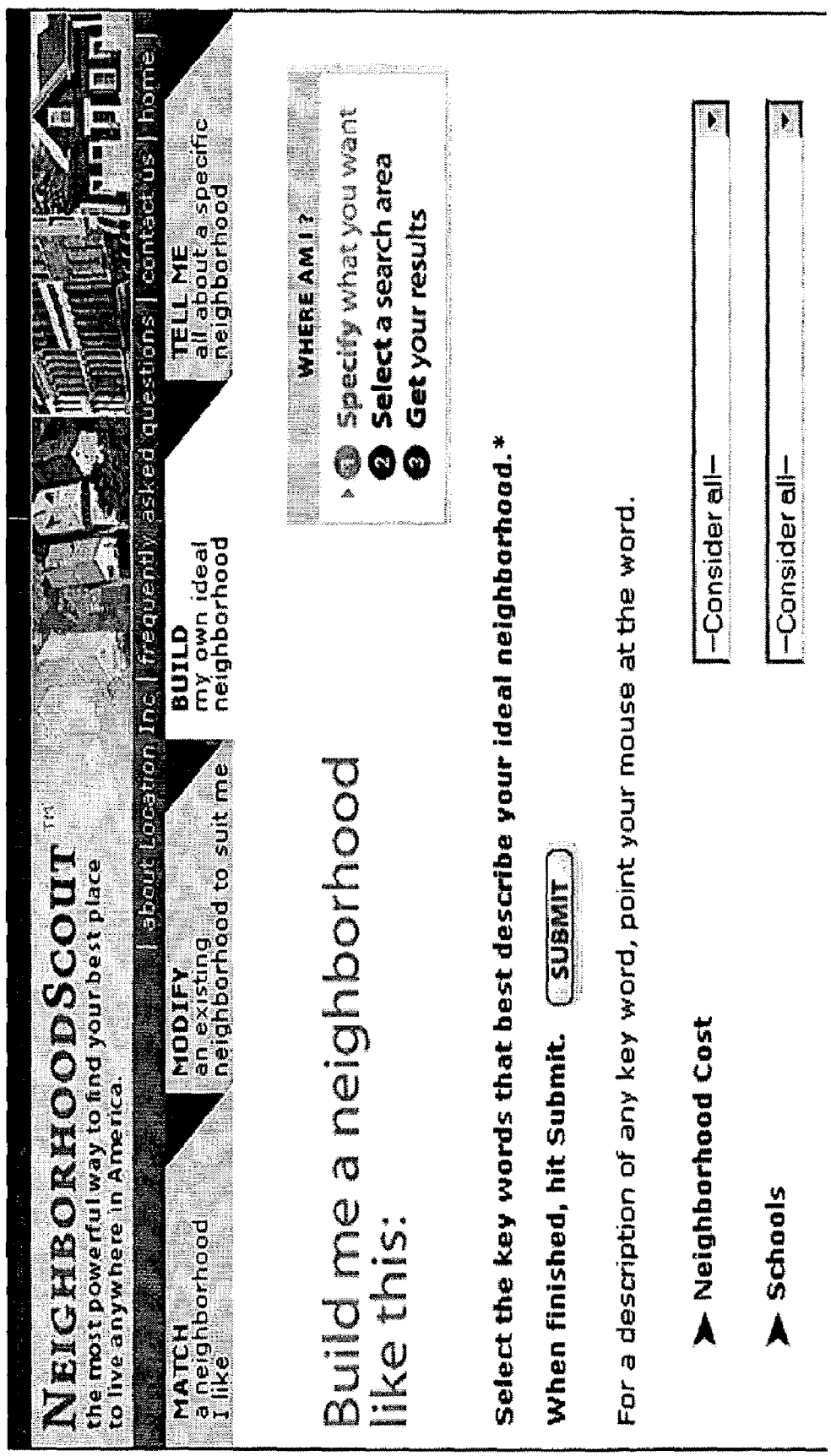

Turning now to FIG. 7, a second distinctive feature of this unique application is the use of key words to allow the user to select characteristics of his or her ideal location, without having to specify numeric values for any, because each of the key words is linked to an underlying data base of numeric values.

FIGS. 8–13 show the unique use of key words describing characteristics of locations in America, key words that can be selected, and are linked to a large numeric data base.

This use of key words is the second distinctive component of this application. As illustrated in preceding slides, these key words describe features and characteristics of locations, where each key word is linked to quantitative values in an underlying data base. This unique approach allows users of the application to select these easy to understand key words to choose what characteristics they wish to have in a location, and then ask the application to find locations that most closely match those chosen characteristics.

Using key words that describe locations linked to quantitative values in a data base means users never have to think in quantitative terms, but can still request to find those locations that have characteristics they want. It is a revolutionary and simple way for users to find the locations that best match their own personal criteria. This is a unique application of key words to geographic, demographic, school, and crime information to describe and find best matching geographic locations.

Figure 15:
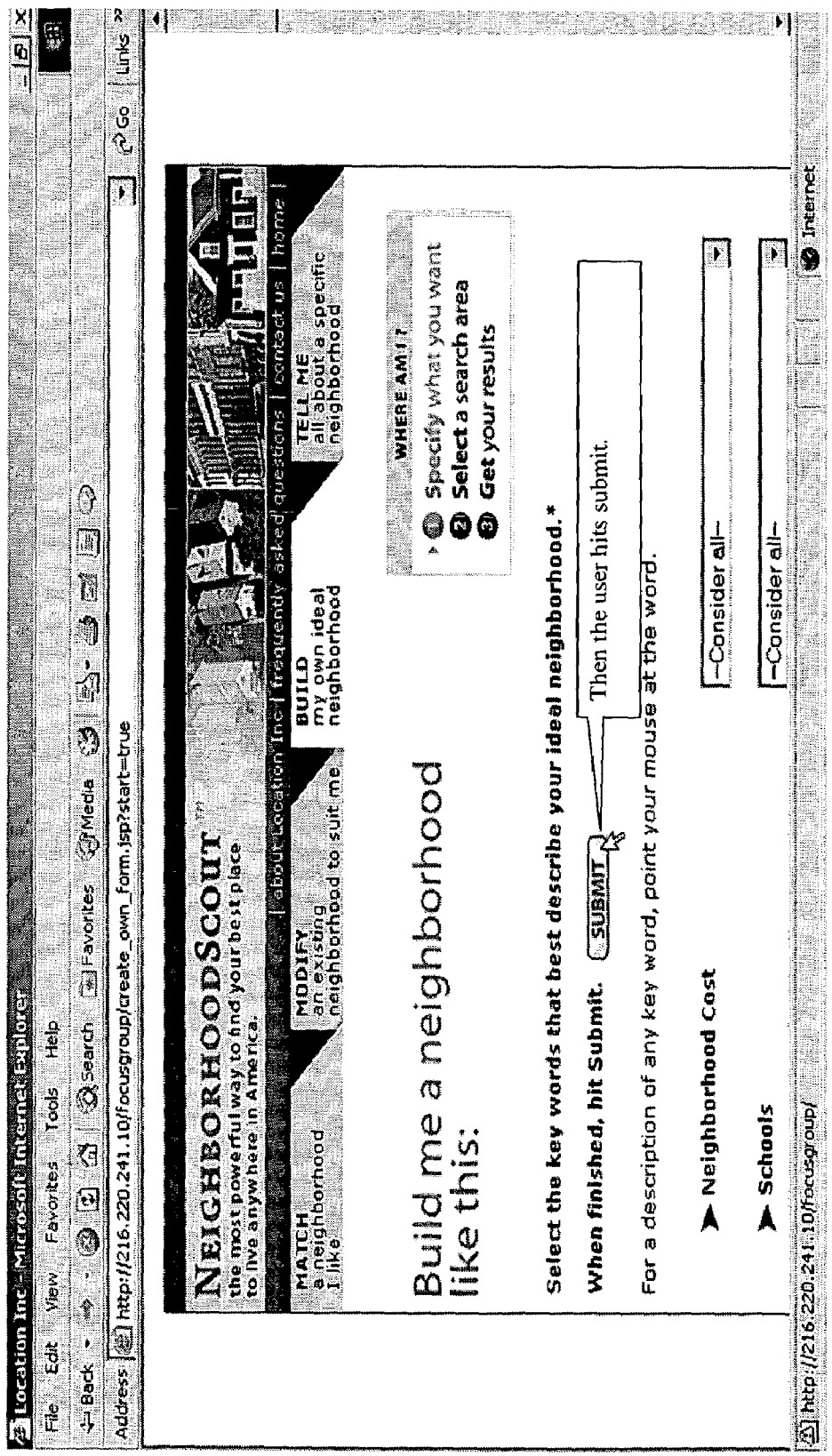
Figure 16:
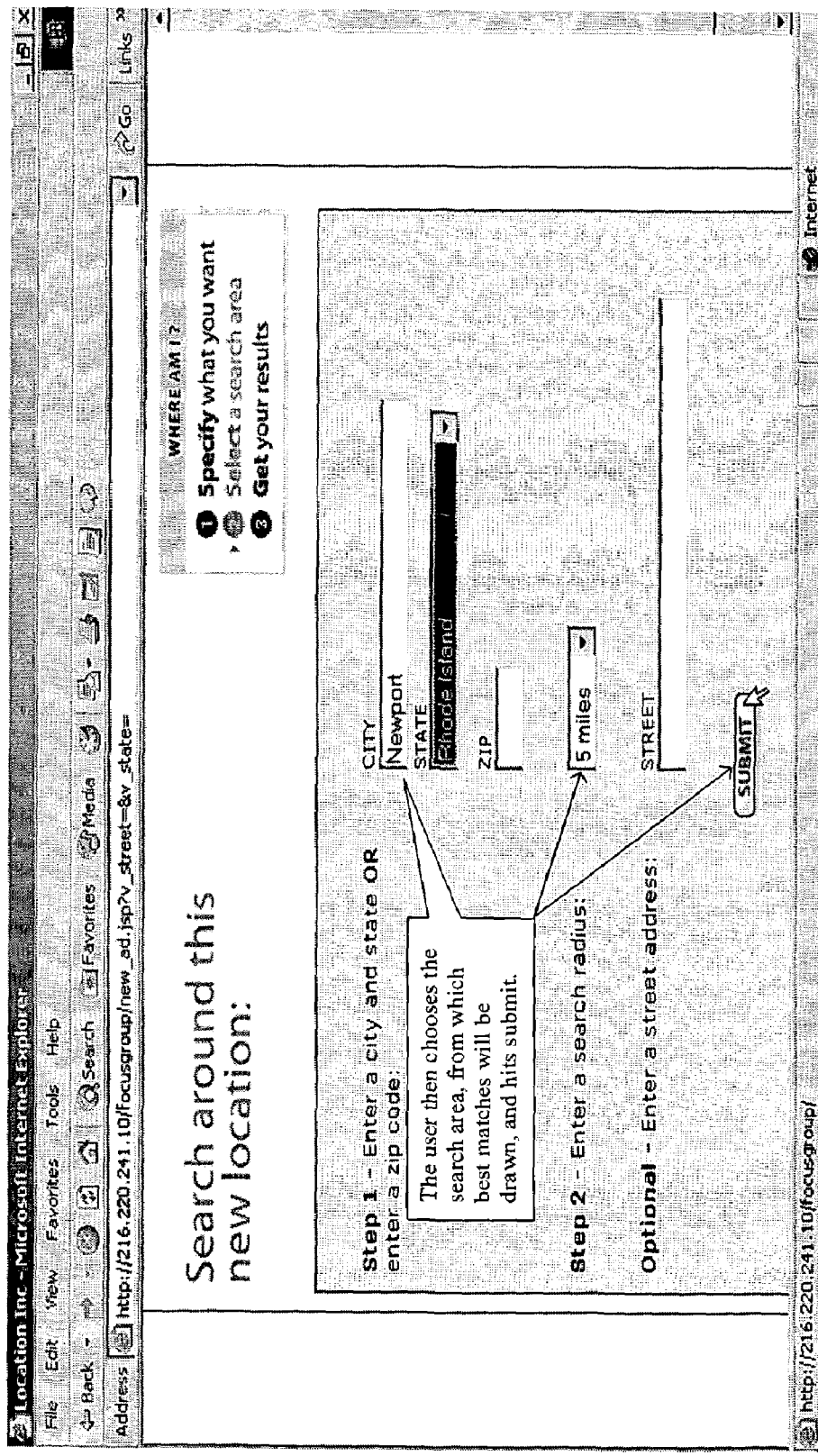

In another aspect of the invention, FIGS. 14–16 Below is an illustration and description of how matches are determined between combinations of selected key words, and real locations. In this illustration, the user simply wants to find a location with historic, large homes. He or she selects those two key words and hits submit (FIG. 15). The user then chooses the search area, from which best matches will be drawn, and hits submit (FIG. 16).

Best matching locations are calculated on the fly as follows, based on the two key words selected:

Step 1. Rank percent scores are calculated for each characteristic, as shown in E, and saved in the data base ahead of time. When the user requests a query, these values are already to go.

E. Rank percent=(k/N)*100

Where k is assigned rank from 1 . . . N, and N is the total number of cases (census tracts).

To calculate rank percent scores, ties are assigned the highest value, and the first rank is assigned a value of 0. This serves to curve the values for each characteristic, such that the rank percent values show the percentage of census tracts in America that are better matches to that specific characteristic than the current census tract (e.g., a rank percent score of 10.5 means that 10.5 percent of the census tracts in America had higher scores for that characteristic than the current census tract).

Step 2. The average absolute difference between the best rank percent score possible for each selected key word and the rank percent score for each of these same key words for every census tract in the search area is calculated. **A zero is always the best rank percent score possible, because this means that zero percent of the census tracts in America have a better score for that key word. This calculation is shown in F. Lastley, the results of the calculation in F are subtracted from 100, so a value of 10 is represented as a 90% match.

$$\text{F.} \quad MkwZ = \sum_k (x_{kk} - x_{jk})/n$$

where $M_{kw}Z$=a location's average match level to the best score possible for all selected key words, $X_{ik}$=value of the rank percent score for key word k for location 1, $X_{hk}$=the lowest possible value for key word k (always zero), and n=the number of k key words selected.

In this example, the user has chosen historic homes, and large homes. The user then chose to search within five miles of Newport, R.I. Matches were calculated as described and are presented on the screen as shown in FIG. 17, and the two top matching locations to the selected set of key words are shown here. As can be seen, the best matching location is an 82% match to the selected key words. As described above, the user can then click on the locations to find out which key words best and least matched. As shown in FIG. 18, the selected location in Newport, R.I. was an 83% match to the key word "historic homes," and an 82% match to the key word "large dwellings." This means that this location has a greater proportion of homes characterized as historic than 83% of the census tracts in America, and this location has a greater proportion of large homes than 82% of the census tracts in America.

In on embodiment as shown in Table 3 are listed in descending order the actual percentages of buildings in each class, while the matches are based on the percentages of census tracts in America that have fewer percentages of the types of buildings the user wishes to have in a location. Thus, the left hand column shows the user what to expect in the location (Newport, R.I., neighborhood #9), and the match level shows how this census tract falls relative to other census tracts in America in regards to the characteristics chosen by the user (historic homes and large homes).

TABLE 3

Neighborhood comparison table

Newport, RI, neighborhood #9    The key words you selected:
Neighborhood Look & Feel
The Buildings Age 83%

| Mostly established, but not old. | Historic homes |
| Some well established older | |
| homes. Some historic homes. | |
| Some newer homes | |

Size 82%

| Mostly medium-sized dwellings. | Large dwellings |
| Some small dwellings. Some | |
| large dwellings | |

Another characteristic of this new product is the ability given to the user to select a location they like, and then modify some characteristics of it by selecting or unselecting key words in a list, so that the location is more to the users liking. Then the modified version is quantitatively compared against real locations in a user-defined search area to find best matches.

Figure 19:
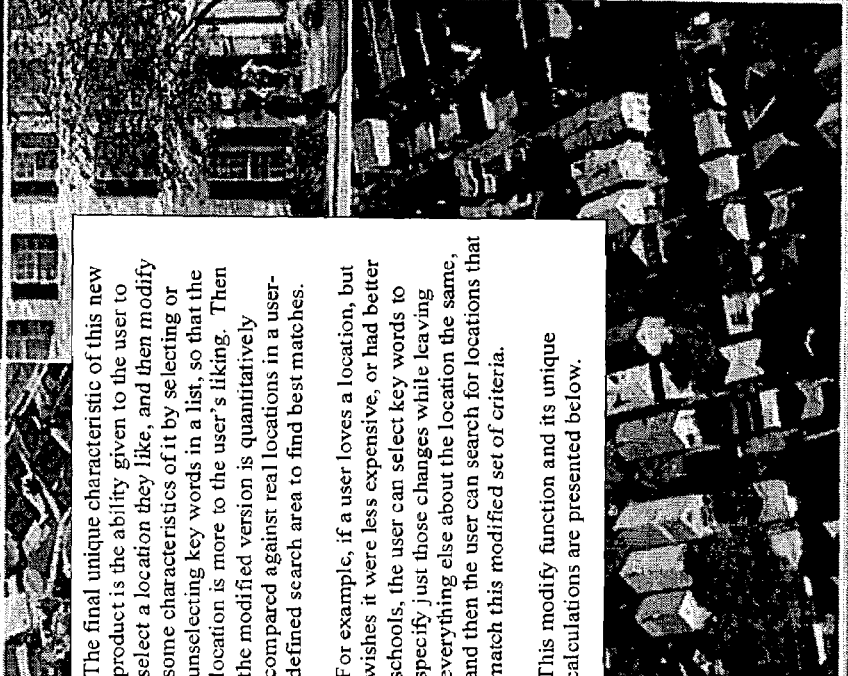
Figure 20:
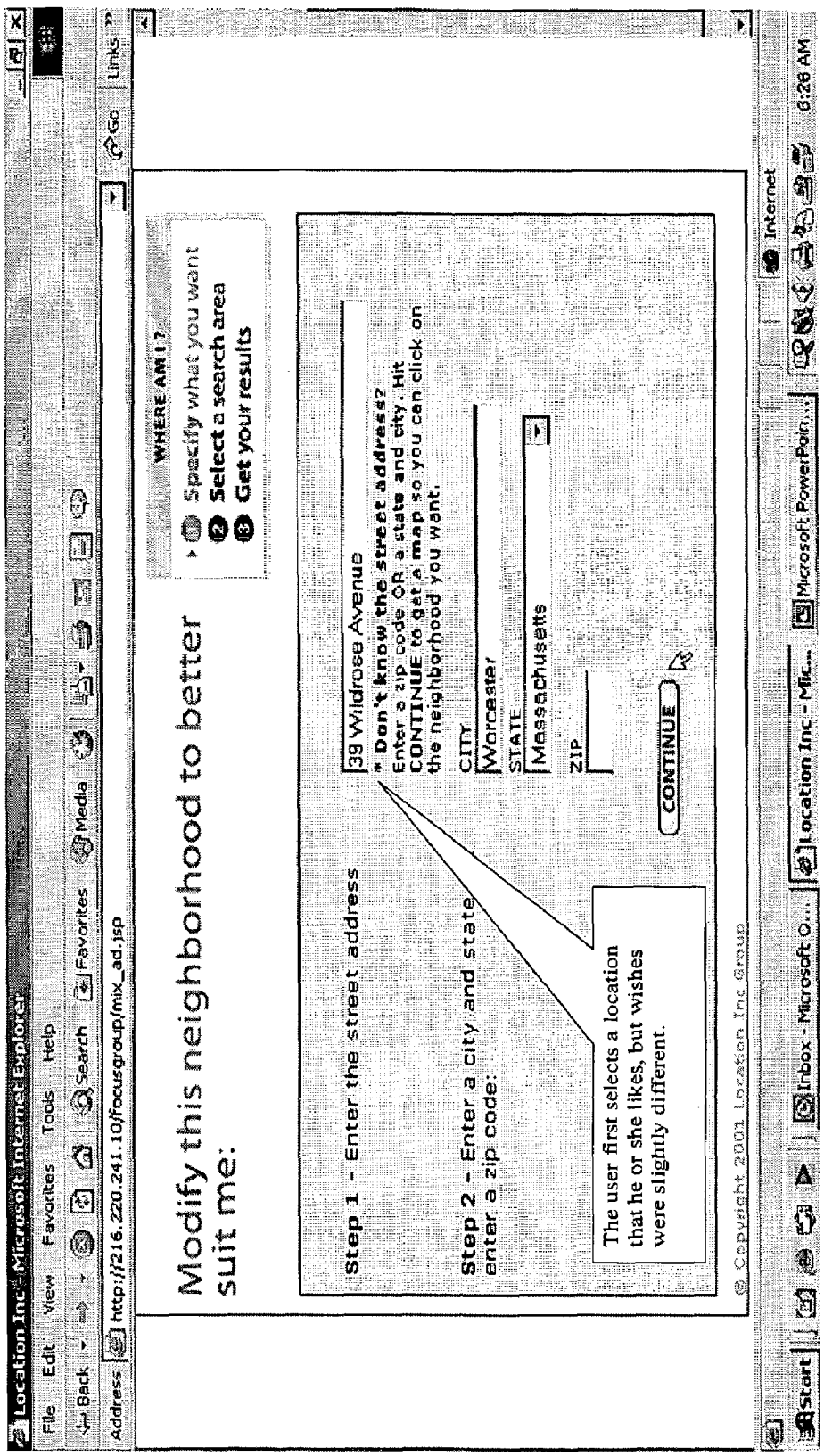
Figure 26:
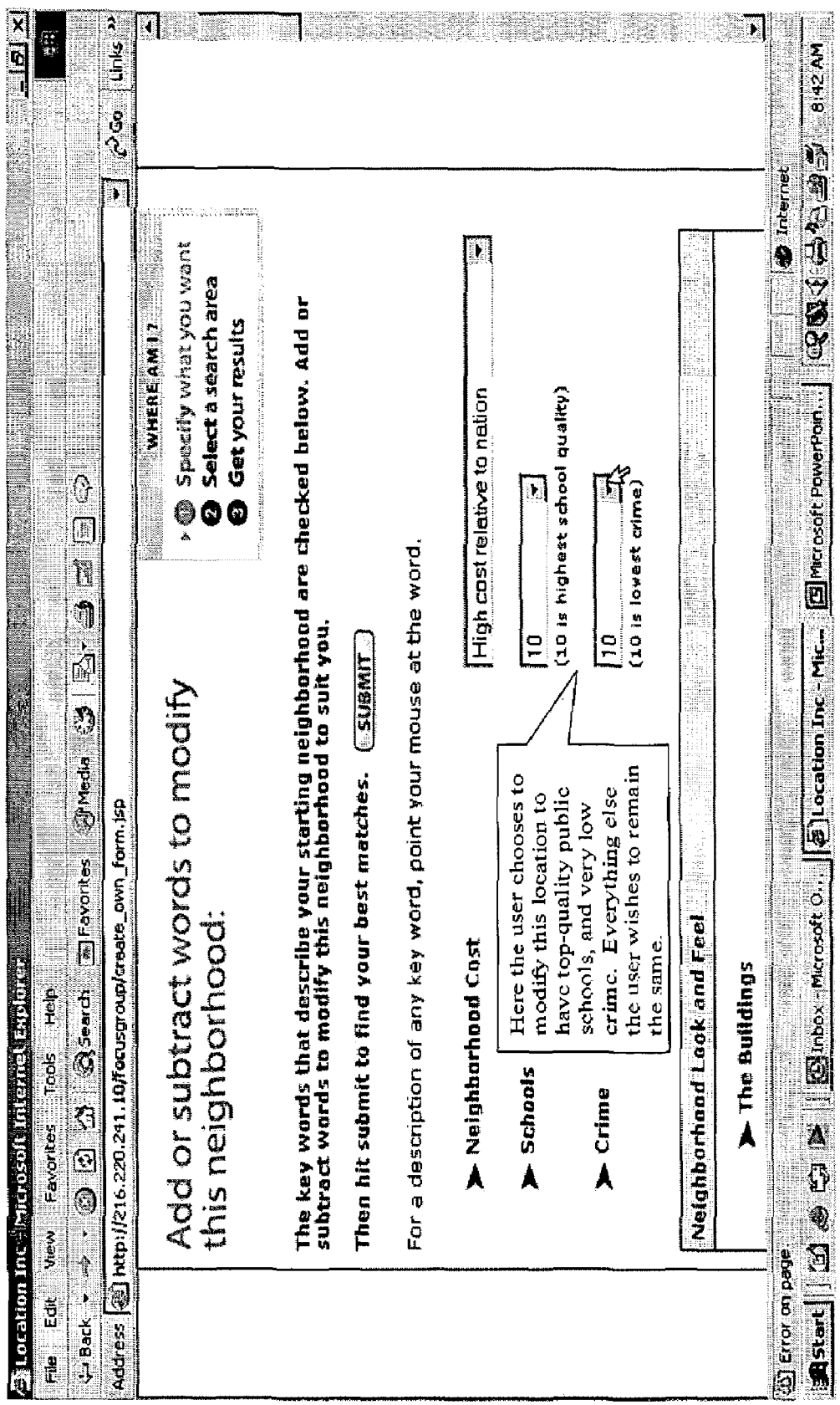
Figure 27:
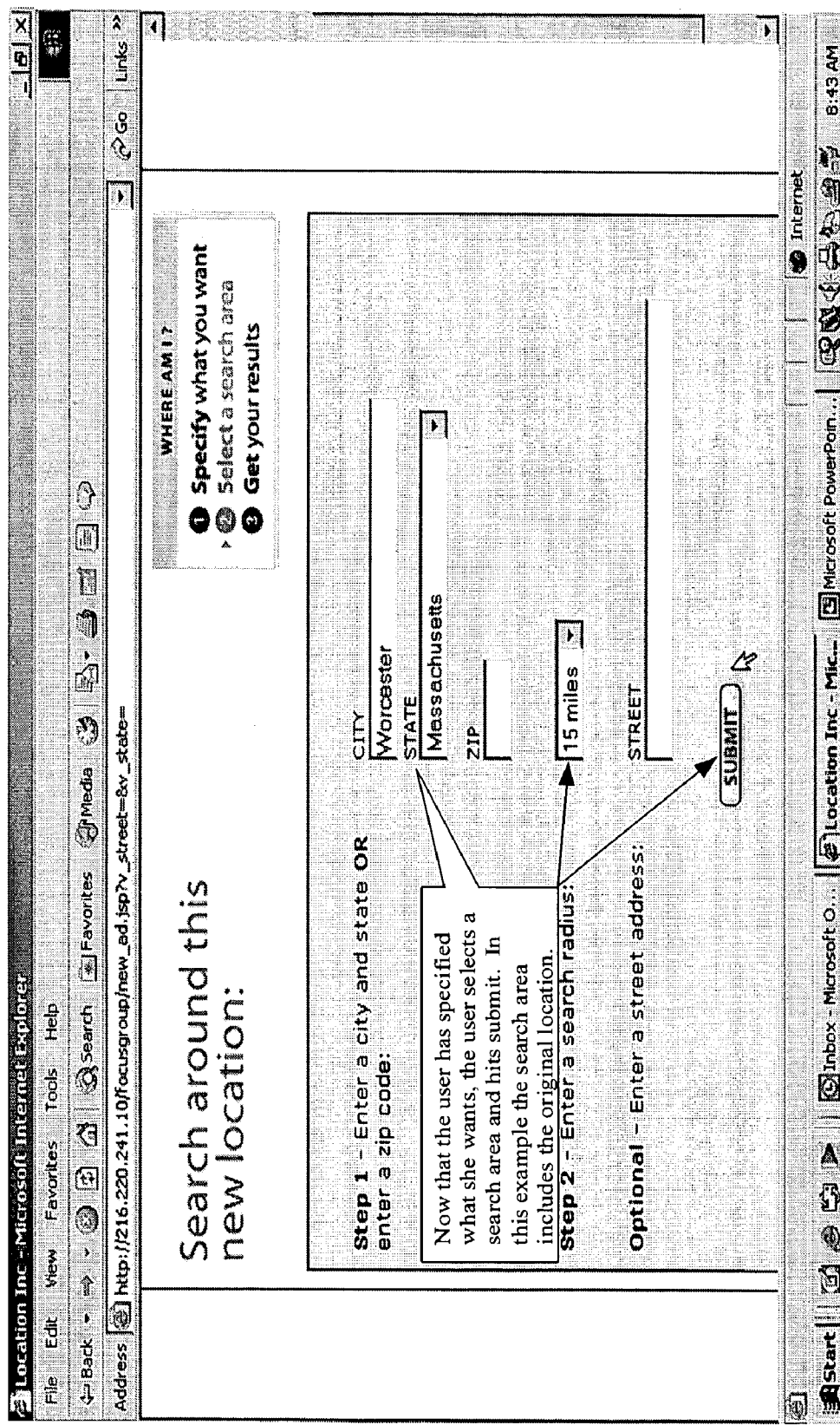

For example, if a user loves a location, but wishes it were less expensive, or had better schools, the user can select key words to specify just hose changes while leaving everything else about the location the same, and then the user can search for locations that match this modified set of criteria. The screen display and selection of this feature is shown in FIG. 19. The user first selects a location that he or she likes, but wishes were slightly different (FIG. 20). The user is then presented with a scrollable page and asked to add or subtract words to modify the location as they wish. FIGS. 21–25 show how this location—39 Wildrose Avenue, Worcester, Mass., is currently described, and all the things the user could chose to modify it. The user is then presented with a screen display as shown in FIG. 26, and in this example has chosen to modify the desired location to have top-quality public schools, and very low crime. Everything else the user wishes to remain the same. The user then selects a search area and hits submit as shown in FIG. 27. In this example, the search area includes the original location.

Search results are delivered as shown in FIGS. 28 and 29. Here, the user sees that she wanted a location like 39 Wildrose Avenue in Worcester, yet modified to have top-quality public schools and a low crime rate. And, that the area to search for matches is within 15 miles of Worcester. Here, the results are presented with match levels. One can see that the second best match in the search area is the original, unmodified neighborhood itself. The best match is a location in Holden, Mass.

The unique calculation used to match modified locations is performed as follows. The essence of the calculation in G is described here:

$$\text{G.} \quad M \bmod = \left( \left( \sum_k (x_{kk} - x_{jk}) * 2 + \left( \sum_k \text{ABS}(x_{ik} - x_{jk}) \right) \right) \right) / n$$

where $M_{mod}$ = a location's match level to the combination of both the modified and unmodified key word values for which we are searching for matches, $X_{ik}$ = value of the rank percent score for key word k for location l, $X_{hk}$ = the user selected value for the rank percent score for modified key word k (if a check box is used, than the value will be zero, for drop-down boxes, the value can be anything the user chooses), and n = the sum of the number of k key words modified *2, and the number of k key words unmodified.

The absolute difference is summed between rank percent scores for each unmodified characteristic of the location to match, and each location in the user-specified search area. This summed difference between each compared location is saved. This summed difference is then added to the summed absolute difference for the rank percent scores the user has modified. These modified scores, however, are first multiplied by 2 to increase their relative importance because the user purposefully wants to change them. Then, these two absolute difference values are summed, and divided by the number of modified key words (on this instance 2), plus the number of key words unmodified (=n). This value is then subtracted from 100 to give a match level where 0=no match, and 100=a perfect match.

Obviously, many modifications and variations of the present invention are possible in light of the above teachings. It is, therefore, to be understood that within the scope of the present application, the present invention may be practiced otherwise than as specifically described.

What is claimed is:

1. A computer-implemented method of selecting a geographic location having similarities to another geographic location in at least one user defined category, the method comprising the steps of:
   a. selecting a plurality of geographic locations;
   b. selecting a plurality of predefined characteristics applicable to the geographic locations;
   c. defining a range of values for each characteristic, each value representating a degree to which a geographic location embodies the characteristic;
   d. defining a data base of geographic locations and characteristics, and populating the data base with characteristic values for the geographic locations;
   e. selecting a first geographic location from the data base; and,
   f. comparing the first geographic location in the data base with other geographic locations in the data base and generating an ordered list of other geographic locations most similar to the first geographic location,
   wherein the step of comparing the first geographic location in the data base with other geographic locations in the data base and generating an ordered list of other geographic locations most similar to the first geographic location comprises generating a dissimilarity matrix in which an overall dissimilarity value is assigned to each of the other geographic locations relative to the first location, and generating an ordered list of the other geographic locations therefrom, and
   wherein the step of generating a dissimilarity matrix comprises the step of applying an extraction method to the raw data, the extraction method including a factor analysis to extract factors from the data base, and applying a squared Euclidian distance measure to the extracted factors.

2. A method according to claim 1 wherein the extraction method comprises a principal component factor analysis of a correlation matrix R is specified in terms of its eigenvalue-eigenvector pairs, $$\left(\begin{matrix}\Omega & \Omega \\ \lambda_1, & \lambda_1\end{matrix}\right), \left(\begin{matrix}\Omega & \Omega \\ \lambda_2, & \lambda_2\end{matrix}\right), \ldots, \left(\begin{matrix}\Omega & \Omega \\ \lambda_N, & \lambda_N\end{matrix}\right),$$

$$\text{where } \frac{\Omega}{\lambda_1} \geq \frac{\Omega}{\lambda_2} \geq \ldots \geq \frac{\Omega}{\lambda_\gamma};$$

where m>p is the number of common factors, and p is the total number of original variables; where the estimated specific variances are provided by the diagonal elements of the matrix R−L̃L̃', such that $$\tilde{\psi} = \begin{bmatrix} \tilde{\psi}_1 & 0 & \cdots & 0 \\ 0 & \tilde{\psi}_2 & \cdots & 0 \\ \vdots & \vdots & \ddots & \vdots \\ 0 & 0 & \cdots & \tilde{\psi}_\gamma \end{bmatrix} \text{ with } \tilde{\psi}_i = R_{ii} - \sum_{j=1}^{m} \tilde{l}_{ij}^2$$

for ith variable, jth factor; where in communalities are estimated as $\tilde{h}_i^2 = \tilde{l}_{i1}^2 + \tilde{l}_{i2}^2 + \ldots + \tilde{l}_{im}^2$; and where the number of factors extracted is set to capture 95% of the total variance contained in the original data.

3. A method according to claim 2 wherein the extracted factors for every characteristic are saved in the data base for each geographic location.

4. A method according to claim 3 wherein the saved factors for each geographic location are input to the formula $$d_{ij} = \sum_k (x_{ik} - x_{jk})^2$$

where d=distance, and $x_{ik}$=value of factor k for census tract i, to calculate a dissimilarity matrix containing each geographic location.

5. A method according to claim 4 wherein an ordered list of geographic locations is displayed to a user, the order of the displayed geographic locations determined by the dissimilarity matrix.

6. A computer-implemented method of selecting a geographic location having similarities to another geographic location in at least one user defined category, the method comprising the steps of:

a. selecting a plurality of geographic locations;

b. selecting a plurality of predefined characteristics applicable to the geographic locations;

c. defining a range of values for each characteristic, each value representating a degree to which a geographic location embodies the characteristic;

d. defining a data base of geographic locations and characteristics, and populating the data base with characteristic values for the geographic locations;

e. selecting a first geographic location from the data base; and, f. comparing the first geographic location in the data base with other geographic locations in the data base and generating an ordered list of other geographic locations most similar to the first geographic location, wherein the step of comparing the first geographic location in the data base with other geographic locations in the data base and generating an ordered list of other geographic locations most similar to the first geographic location comprises generating a dissimilarity matrix in which an overall dissimilarity value is assigned to each of the other geographic locations relative to the first location, and generating an ordered list of the other geographic locations therefrom, and wherein the step of generating a dissimilarity matrix comprises the step of applying an extraction method to the raw data that simultaneously eliminates multicolinearity from the raw data in the data base and standardizes the raw data in the data base.

* * * * *